W. V. TURNER.
FLUID PRESSURE BRAKE.
APPLICATION FILED JUNE 5, 1918.
1,316,206.
Patented Sept. 16, 1919.
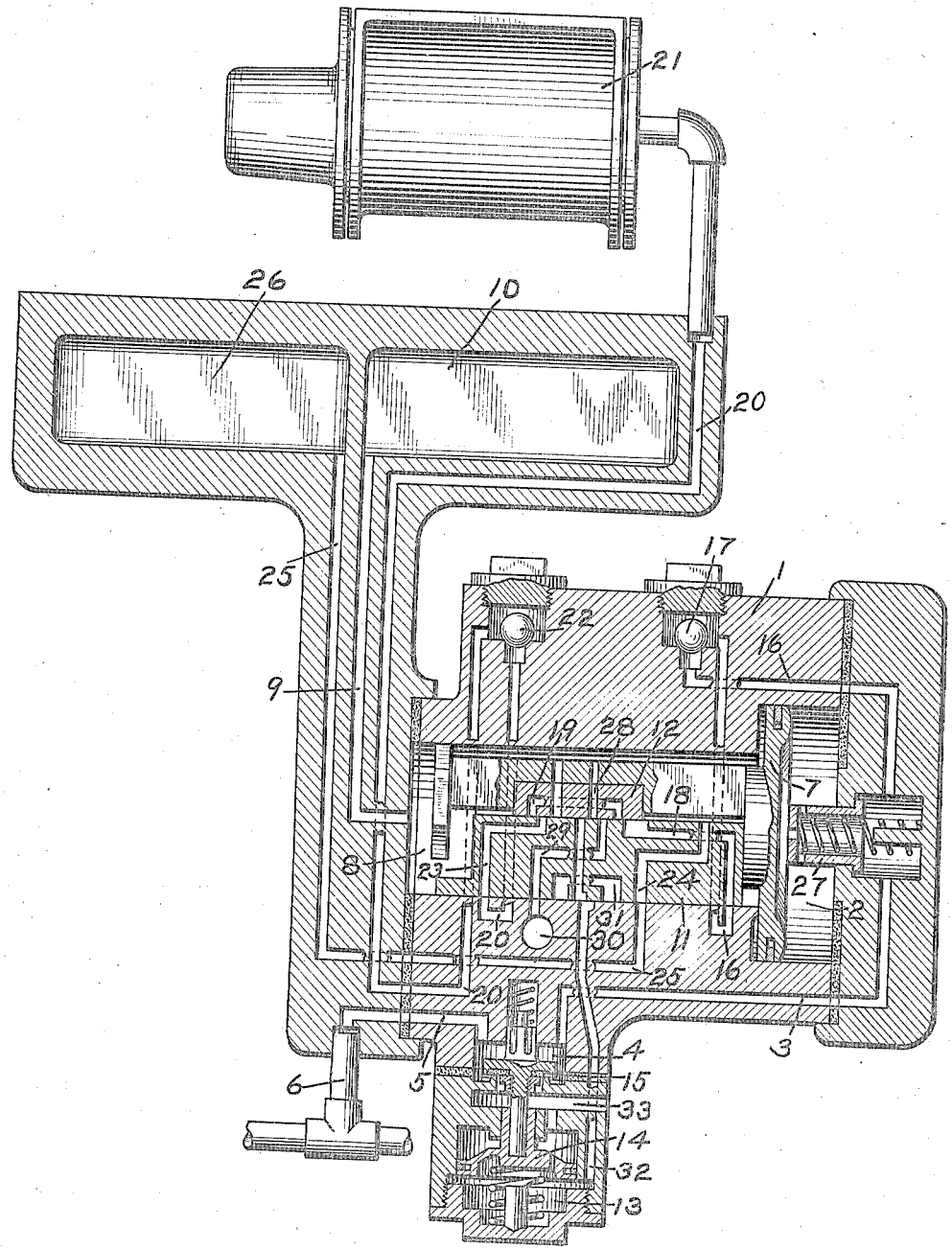
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,316,206.      Specification of Letters Patent.    Patented Sept. 16, 1919.

Application filed June 5, 1918. Serial No. 238,278.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to means for obtaining quick serial action in a service application of the brakes.

It has heretofore been proposed to provide means in connection with a triple or equalizing valve device for venting fluid from the brake pipe in a service application of the brakes to effect a quick serial action of the brakes throughout the train.

It has also been proposed to provide an equipment having an equalizing valve device for controlling the brakes in service and an emergency valve mechanism for effecting an emergency application of the brakes.

With an equipment of the above character, the quick service feature might be incorporated in the equalizing valve device, but this would necessitate the enlargement of the slide valve and piston.

In order to avoid the above changes in the equalizing valve device, the principal object of the present invention is to incorporate the quick service feature in the emergency valve mechanism, which involves only a slight modification of the equipment.

In the accompanying drawing, the single figure is a sectional view of the emergency valve mechanism portion of a brake equipment, with my improvement embodied therein.

As shown in the drawing, the emergency valve mechanism may comprise a casing 1 having a piston chamber 2 connected through passage 3, quick action valve chamber 4, and passage 5 with brake pipe 6 and containing piston 7 and having a valve chamber 8 connected by passage 9 to quick action chamber 10 and containing a slide valve 11 and an auxiliary slide valve 12, adapted to be operated by piston 7.

The casing 1 also has a piston chamber 13 connected to a passage 32 leading to the seat of slide valve 11 and containing quick action piston 14 for operating quick action valve 15, contained in valve chamber 4.

According to my invention, in addition to the usual ports and passages of the emergency valve mechanism, there is provided a passage 16, leading from piston chamber 2 to the seat of slide valve 11, and containing a check valve 17, a port 18 in slide valve 11, adapted in release position of the slide valve to register with passage 16, a cavity 19 in the auxiliary slide valve 12, and a passage 20, leading from the brake cylinder 21 to the seat of slide valve 11 and containing a check valve 22 and adapted to register with a port 23 in slide valve 11 in the release position of the parts.

In operation, fluid from the brake pipe 6 flows through passage 5 to valve chamber 4, and through passage 3 to piston chamber 2 and thence through passage 16 and port 18 to valve chamber 8, so that piston chamber 2 and valve chamber 8 are charged with fluid at brake pipe pressure, as well as the quick action chamber 10.

Fluid also flows from valve chamber 8, through port 24 and passage 25 to quick action closing chamber 26.

When a gradual reduction in brake pipe pressure is made to effect a service application of the brakes, the piston 7 is moved so as to engage the yielding stop 27. The auxiliary slide valve 12 is thus shifted, so that the cavity 19 connects passages 18 and 23, permitting fluid to be vented from the brake pipe to the brake cylinder, so as to effect quick serial action throughout the train.

In this position, port 28 in auxiliary slide valve 12 registers with port 29 in slide valve 11 and since port 29 registers with exhaust port 30, fluid is vented from valve chamber 8 and the quick action chamber 10, and when the pressure in valve chamber 8 is reduced to a degree slightly less than the reduced brake pipe pressure, the piston 7 shifts the valve 12 so as to cut off the further venting of fluid from the brake pipe to the brake cylinder.

Upon a sudden reduction in brake pipe pressure to effect an emergency application of the brakes, the piston 7 is shifted to its extreme outer position, overcoming the resistance of the yielding stop 27.

In the emergency position of slide valve 11, cavity 31 connects passage 32 with passage 25, so that fluid is supplied from the quick action closing chamber 26 to quick action piston chamber 13.

Quick action piston 14 is then actuated to open the quick action valve 15, so that fluid is vented from the brake pipe 6 to the vent port 33 at an emergency rate.

With a triple or equalizing valve device, the quick service action is dependent upon the relative volumes of the brake cylinder and auxiliary reservoir, since the movement of the triple valve device to control the quick service ports is subject to the rate at which fluid is supplied from the auxiliary to the brake cylinder and to the degree at which the brake cylinder is charged, so that varying sizes of auxiliary reservoirs and brake cylinders influence the action of the quick service feature.

By employing the emergency valve mechanism, the quick action chamber being of the same volume for all equipments, the action of the mechanism is always constant for a given rate of reduction in brake pipe pressure, and consequently the quick service venting of fluid from the brake pipe is rendered more nearly uniform.

Furthermore, the quick service venting of fluid from the brake pipe will continue, so long as the brake pipe pressure is reduced.

Having now described my invention, what I claim as new and desire to secure by Letters Patent, is:

1. In a fluid pressure brake, the combination with a brake pipe, of an emergency valve mechanism having a piston subject to the opposing pressures of the brake pipe and a quick action chamber and a main valve operated by said piston upon a sudden reduction in brake pipe pressure and an auxiliary valve operated by said piston and having one position relative to the main valve for venting fluid from the brake pipe at a service rate and another position for venting fluid from the brake pipe at an emergency rate.

2. In a fluid pressure brake, the combination with a brake pipe, of a piston, a main valve adapted to be operated by said piston, and an auxiliary valve having a movement relative to the main valve and adapted to be operated by said piston upon a gradual reduction in brake pipe pressure for venting fluid through ports in the main valve from the brake pipe.

3. In a fluid pressure brake, the combination with a brake pipe, of a piston, a main valve adapted to be operated by said piston and having ports for venting fluid from the brake pipe upon movement of said piston under a sudden reduction in brake pipe pressure, and an auxiliary valve having a movement relative to the main valve and having ports for venting fluid from the brake pipe through ports in the main valve upon movement of said piston under a gradual reduction in brake pipe pressure.

In testimony whereof I have hereunto set my hand.

WALTER V. TURNER.